UNITED STATES PATENT OFFICE.

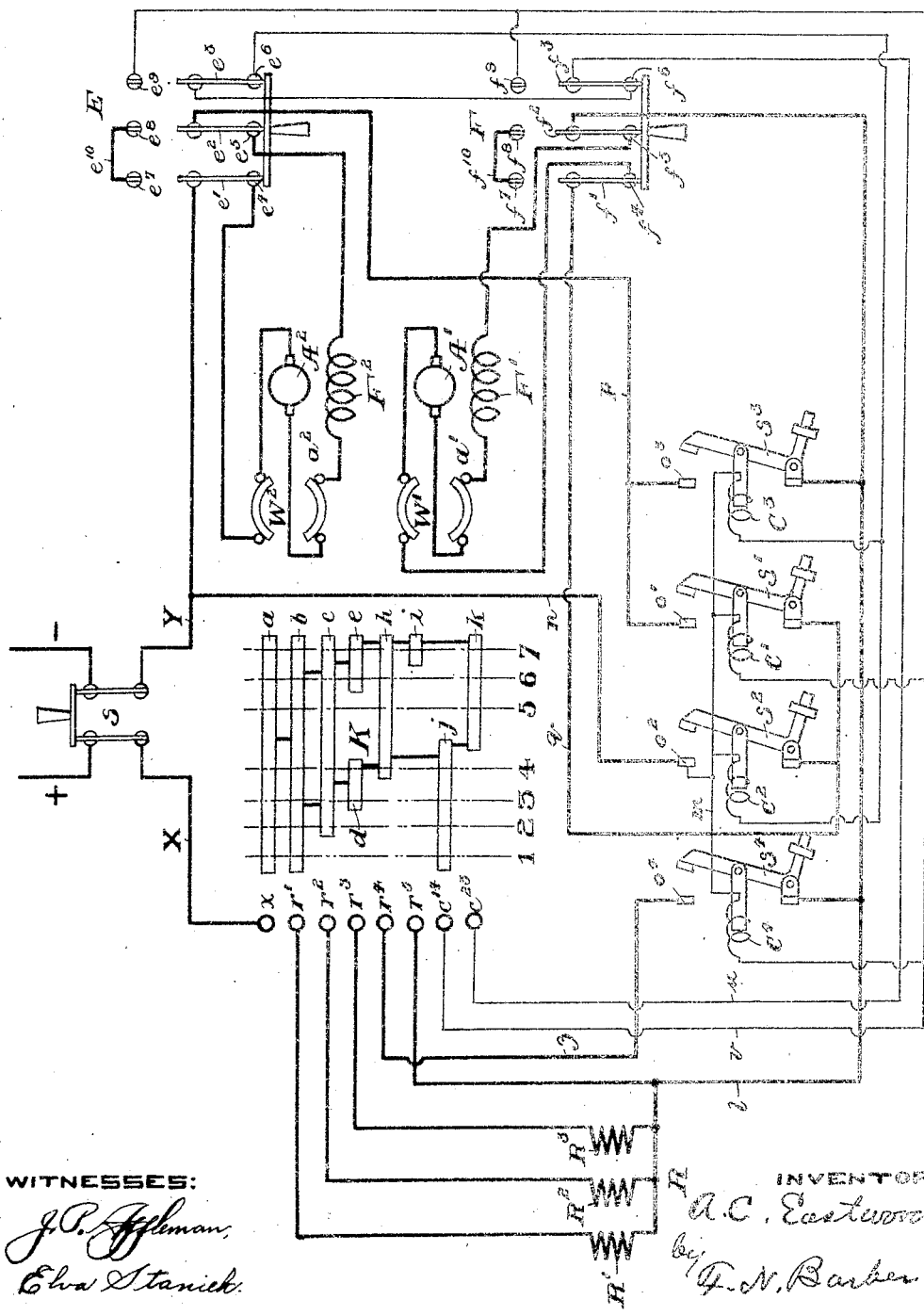

ARTHUR C. EASTWOOD, OF CLEVELAND, OHIO.

CUT-OUT SWITCH FOR SERIES-PARALLEL CONTROLLERS.

No. 859,551.      Specification of Letters Patent.      Patented July 9, 1907.

Application filed September 27, 1906. Serial No. 336,420.

*To all whom it may concern:*

Be it known that I, ARTHUR C. EASTWOOD, a citizen of the United States, residing at Cleveland, in the county of Cuyahoga and State of Ohio, have invented or discovered new and useful Improvements in Cut-Out Switches for Series-Parallel Controllers, of which the following is a specification.

My invention relates to new and improved means for cutting out one motor or one group of motors operated in "series-parallel" by means of a single operating controller.

When two motors or groups of motors are operated in series parallel for driving a common load, it is desirable that means be provided for cutting out one motor or group of motors in case of trouble therewith, the load being driven by the remaining motor or motors till the necessary repairs can be effected. To secure this result it has been customary to provide switches for cutting out either motor or group of motors and short-circuiting the cut-out motor or motors. This permits of operating the remaining motor or group of motors only on the "series" notches of the operating controller. If the operating controller were moved to the "parallel" position, the short-circuited motor or group of motors would necessarily form a short-circuit across the supply mains. To prevent this it is customary to provide mechanical locking means whereby, when the switch is thrown for cutting out and short-circuiting one motor or group of motors, it will be impossible to operate the operating controller beyond the full series position, thereby preventing the possibility of a short-circuit across the supply mains. This arrangement necessitates a rather complex system of interlocking levers and is open to the further objection that the operator, being accustomed to operate the controller to the full speed position and being unaccustomed to the presence of a mechanical interlock or stop which prevents the operation of the controller beyond the last series notch, will strike the stop with considerable force, particularly where conditions demand rapid operation of the controller. This is, of course, confusing to the operator and at the same time injurious to the parts of the controller.

My improved cut-out switches are particularly adapted for use in connection with series-parallel controllers, such as those described in my pending application for United States Patent, Serial No. 333,563, wherein the change of motor connections from series to parallel is accomplished by means of power-actuated switches. My invention provides simple and inexpensive means for cutting out one motor or group of motors and at the same time imposes no obstacle to the operation of the operating controller, so that the operator may move his operating lever just as usual, no change in connections taking place, however, after the last series notch is reached, the possibility of short-circuiting the supply mains being prevented.

Referring to the drawings, the figure is a diagram of connections illustrating the application of my cut-out switches to a series-parallel controller.

In the figure, $A^1$ is the armature and $F^1$ the field winding of one motor; and $A^2$ and $F^2$ the armature and field winding of a second motor.

$W^1$ and $W^2$ are the reversing switches for the respective motors.

K is the operating switch which is indicated as being of the drum type having a series of contact rings, $a, b, c, \ldots k$, mounted so as to form portions of the surface of a cylinder, these rings being adapted to make contact, respectively, with the corresponding stationary contact fingers, $x, r^1, r^2, r^3, r^4, r^5, C^{14}, C^{23}$, as the drum or cylinder of the controller is rotated by a suitable handle or lever.

$R^1$, $R^2$ and $R^3$ are sections of the resistance R used in regulating the speed of the motors and for limiting the flow of current in starting the motors and at the time of changing the motor connections from series to parallel.

$S^1$, $S^2$, $S^3$ and $S^4$ are power-actuated switches, each switch in this case being indicated as actuated by an electro-magnet, the several electro-magnets having the respective coils, $C^1$, $C^2$, $C^3$, and $C^4$.

When the motors are operated in series, the switches $S^1$ and $S^4$ are closed and the switches $S^2$ and $S^3$ are open; and when the motors are operated in parallel, the switches $S^2$ and $S^3$ are closed and the switches $S^1$ and $S^4$ are open, as fully described in my application, Serial No. 333,563.

F is the cut-out switch controlling the motor $a^1$, which has the armature $A^1$ and the field $F^1$, while E is a cut-out switch controlling the motor $a^2$, which has the armature $A^2$ and the field $F^2$. When the switches are in the position shown both motors are in service. When the switch F is thrown over so that blades $f^1, f^2, f^3$ engage with contacts $f^7, f^8$, and $f^9$, the motor $a^1$ is cut out; and similarly when switch E is thrown over so that its blades $e^1, e^2$, and $e^3$ engage with terminals $e^7, e^8$, and $e^9$, the motor $a^2$ is cut out.

The vertical dotted lines $1, 2, 3 \ldots 7$ represent the relative positions of the contact-strips and the contact-fingers of the controller K in the several operating positions of the controller.

Consider the drum of the controller to be moved into position 1. Current will then flow from the supply main, through the switch S, the wire X, the contact finger $x$, the contact-strips $a, b, c, d, h$, and $j$, the contact-finger $C^{14}$, the wire $v$, the windings $C^1$ and $C^4$ of the switches $S^1$ and $S^4$, the wire $m$, the contact $o^2$ of the switch $S^2$, the wire $n$, the wire Y, and the switch S to the negative main. This completes the circuit through coils $C^1$ and $C^4$ and causes switches $S^1$ and $S^4$ to close. The main circuit is then established as follows:—From the positive main through the switch S, the wire X, the contact-finger $x$, the strips $a$ and $b$, the contact-finger $r^1$, the resistance $R^1$, the wire $l$, the contact $f^2$ of the cut-out switch F, the blade $f^2$, the contact $f^5$, the field $F^1$, the armature $A^1$, and the reversing switch $W^1$ of the motor $a^1$, the contact $f^4$ of the cut-out switch F, the blade $f^1$, the wire $q$, the switch $S^1$, the contact $o^1$, the wire $p$, the blade $e^2$ of the cut-out switch E, the contact $e^5$, the field $F^2$, the armature $A^2$, and the reversing switch $w^2$ of the motor $a^2$, the contact $e^4$ of the cut-out switch E, the blade $e^1$, the wire Y, and the switch S to the negative main. The two motors are then in series and in series with the resistance $R^1$.

In position, 2 of the controller K, the connections are the same as in position 1 except that the resistance $R^2$ is in parallel with the resistance $R^1$.

In position 3, the resistance $R^1$, $R^2$ and $R^3$ are in parallel with one another and in series with the motors, which are still connected in series.

In position 4, the current passes from the finger $x$ through the drum of the controller K to the finger $r^4$, thence through the wire $z$, the contact $o^4$, and the switch $S^4$ directly to the motors which are still connected in series. All of the resistance is then short circuited and the motors should operate at full series speed.

In passing from position 4 to position 5, the switches $S^1$ and $S^4$ open and switches $S^2$ and $S^3$ simultaneously close, as described in my application, Serial No. 333,563. The path of the main current in position 5 is as follows:—From the finger $x$ through the strips $a$, $b$, and $c$, the drum of the controller $k$, through the fingers $r^1$ and $r^2$ and the resistance $R^1$ and $R^2$ in parallel, to the blade $f^2$ of the cut-out switch F, thence through the blade $f^2$ and the contact $f^5$, through the field $F^1$, the lower contacts of the reversing switch $W^1$, the armature $A^1$, the upper contacts of reversing switch $W^1$ of the motor $a^1$, to the contact $f^4$, thence to the contact $f^1$, to the lower terminal of switch $S^2$, thence through the switch $S^2$, the contact $o^2$, and the wire $n$ to the supply main Y, thus completing the circuit through the motor $a^1$. A second path is also provided for the current as follows:—From the resistances $R^1$ and $R^2$ in parallel, through the wire $l$ to the lower terminal of the switch $S^3$, through switch $S^3$ and the contact $e^3$ to the contact $e^2$ of the cut-out switch E, thence to contact $e^5$, through the field $F^2$, the lower contacts of the reversing switch $W^2$, the armature $A^2$, the upper contacts of switch $W^2$ to the contact $e^4$, thence through the blade $e^1$ to the supply main Y, thus completing the circuit through the motor $a^2$. The two motors are then in parallel with each other and in series with the resistances $R^1$ and $R^2$, which are also connected in parallel with each other.

In position 6, the connections remain the same as in position 5 with the exception that the resistance $R^3$ is in parallel with the resistances $R^1$ and $R^2$.

In position 7, the current passes directly from the drum of the controller, through the finger $r^6$ to the two motors in parallel, the resistance being entirely short-circuited. The motors, therefore, should operate at full speed.

If the cut-out switch F be thrown upward so that the blades $f^1$, $f^2$, and $f^3$ engage the contacts $f^7$, $f^8$, and $f^9$, the motor $a^1$ will be cut out and the current, instead of passing through this motor will pass through the jumper $f^{10}$ connecting the contacts $f^7$ and $f^8$. Similarly, if cut-out switch E be thrown upward, the motor $a^2$ will be cut out and the jumper $e^{10}$ between the contacts $e^7$ and $e^8$ will be substituted therefor.

The contact finger $c^{14}$, in addition to being connected to one end of each of the switch coils $C^1$ and $C^4$, is also connected to the terminal $f^9$ of the cut-out switch F and to the terminal $e^9$ of the cut-out switch E. Contact finger $c^{23}$ is connected to the terminal $f^6$ of switch F and before current can pass from the finger $c^{23}$ to the coils of the parallel switches $S^2$ and $S^3$, it must pass through the blade $f^3$ of the switch F to the terminal $f^9$, thence through blade $e^3$ of switch E to terminal $e^9$ and thence to the coils $C^2$ and $C^3$. It will be seen that, if either of the switches E or F be thrown over to cut-out the corresponding motor, this circuit will be interrupted so that the corresponding ring on the controller cannot cause actuation of the parallel switches $S^2$ and $S^3$. If either motor then is cut out, the parallel switches will be rendered inoperative. It will be seen further that if switch F be thrown up to cut out the motor $a^1$, the wire from the finger $c^{23}$ will be in connection through the blade $f^3$ and the terminal $f^9$ of the switch F with the coils $C^1$ and $C^4$ of the switches $S^1$ and $S^4$. Similarly, if the switch E be thrown up to cut out the motor $a^2$, the path from the finger $c^{23}$ will be as follows:— Through the wire $u$ to the blade $f^3$ and the contact $f^6$ of switch F, to the blade $e^3$ and the contact $e^9$ of the switch E, to the windings $C^1$ and $C^4$ of switches $S^1$ and $S^4$. It will be understood, therefore, that when either motor is cut out the contact finger $c^{23}$ is disconnected from the actuating coils of switches $S^2$ and $S^3$ and is connected to the actuating coils of switches $S^1$ and $S^4$. The connection of contact finger $c^{14}$ to the actuating coils of switches $S^1$ and $S^4$ is not disturbed by the actuation of either cut-out switch. It, therefore, follows that when either motor is cut out, the series switches $S^1$ and $S^4$ remain closed in any operating position of the controller K, the coils $C^1$ and $C^4$ receiving current through the finger $C^{14}$ in positions 1 to 4 of the controller, and through the finger $c^{23}$ in positions 5 to 7. In position 4, all of the resistance is cut out, current passing from the drum of the controller through the finger $r^4$ and the switch $S^4$ to whichever motor remains in circuit. Since the finger $r^4$ remains in contact with the corresponding strip on the drum of the controller K in all subsequent positions of the controller, further actuation of the controller produces no change in motor connections. Therefore, when either motor is cut-out, the controller K may be operated just as usual, the remaining motor being controlled by the resistances $R^1$, $R^2$, and $R^3$, reaching full speed at position 4 and operating under the same conditions in all subsequent positions of the controller K.

I claim—

1. In a series-parallel controller for two motors or groups of motors, a cut-out switch for cutting out one motor or group of motors, and means controlled by said switch for preventing changes in the circuit of the remaining motor or group of motors, when the controller is operated beyond the full series position.

2. In a series-parallel controller for two motors or groups of motors, a cut-out switch for cutting out either motor or group of motors, and means controlled by said switch for preventing changes in the circuit of the remaining motor or group of motors when the controller is operated beyond the full series position.

3. In a series-parallel controller for two motors or groups of motors, an operating switch including contacts for connecting the motors in series and in parallel, a cut-out switch for each motor, and means for preventing the opening of the series contacts when one of said cut-out switches has been opened and when the controller has been operated beyond the full series position.

4. In a series-parallel controller for two motors or groups of motors, the combination of a power-actuated switch for connecting the motors or groups of motors in series, a power-actuated parallel switch for connecting the motors or groups of motors in parallel, an operating switch, and a cut-out switch for cutting out one motor or group of motors, the connections being such that, when said cut-out switch is actuated to cut out one motor or group of motors, said power-actuated series switch will be energized in any operating position of said controlling switch.

5. In a series-parallel controller for two motors, or groups of motors, the combination of a power-actuated series switch for connecting the motors or groups of motors in series, a power-actuated parallel switch for connecting the motors or groups of motors in parallel, an operating switch, and a cut-out switch for cutting out either motor or groups of motors, the connections being such that when said cut-out switch is actuated to cut out either motor or groups of motors, said power-actuated parallel switch can not be energized.

6. In a series-parallel controller for two motors or groups of motors, the combination of a power-actuated switch for connecting the motors or groups of motors in series, a power-actuated switch for connecting said motors or groups of motors in parallel, an operating switch, and cut-out switches for cutting out either motor or groups of motors, the connections being such that, when the cut-out switch is actuated to cut out either motor or group of motors, said power-actuated series switch will be energized in any operating position of said operating switch and said power-actuated parallel switch will not be energized in any operating position of said operating switch.

7. In a series-parallel controller for two motors or groups of motors, a controlling switch, means controlled by said switch for placing the motors in series, means controlled by said switch for placing the motors in parallel, a switch for cutting out one of the motors, alternate contacts for the cut-out switch, a connection between one contact and the said means for placing the motors in series, and connections from the remaining contact to the said means for placing the motors in series and to that portion of the controlling switch which controls the change of the motors from series to parallel.

Signed at Cleveland, Ohio, this 24th day of September, 1906.

ARTHUR C. EASTWOOD.

Witnesses:
C. W. COMSTOCK,
S. L. MEIKLE.